United States Patent
Knigge et al.

(10) Patent No.: US 8,059,357 B1
(45) Date of Patent: Nov. 15, 2011

(54) DISK DRIVE ADJUSTING FLY HEIGHT WHEN CALIBRATING HEAD/DISK CONTACT

(75) Inventors: Bernhard E. Knigge, San Jose, CA (US); James P. R. McFadyen, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 68 days.

(21) Appl. No.: 12/727,166

(22) Filed: Mar. 18, 2010

(51) Int. Cl.
*G11B 5/60* (2006.01)

(52) U.S. Cl. .......................................... 360/75

(58) Field of Classification Search .................. None
See application file for complete search history.

(56) References Cited

U.S. PATENT DOCUMENTS

| | | | |
|---|---|---|---|
| 4,775,902 A | 10/1988 | Trovato et al. | |
| 4,777,544 A | 10/1988 | Brown et al. | |
| 4,804,894 A | 2/1989 | Machida et al. | |
| 4,839,754 A | 6/1989 | Gami et al. | |
| 5,130,866 A | 7/1992 | Klaassen et al. | |
| 5,168,413 A | 12/1992 | Coker et al. | |
| 5,377,058 A | 12/1994 | Good et al. | |
| 5,594,595 A | 1/1997 | Zhu | |
| 5,742,446 A | 4/1998 | Tian et al. | |
| 5,909,330 A | 6/1999 | Carlson et al. | |
| 5,949,605 A | 9/1999 | Lee et al. | |
| 6,008,640 A | 12/1999 | Tan et al. | |
| 6,052,243 A | 4/2000 | Shimada | |
| 6,097,559 A | 8/2000 | Ottesen et al. | |
| 6,104,687 A * | 8/2000 | Lee et al. | 369/112.24 |
| 6,125,008 A * | 9/2000 | Berg et al. | 360/264.4 |
| 6,175,456 B1 | 1/2001 | Yun | |
| 6,178,157 B1 * | 1/2001 | Berg et al. | 360/294.7 |
| 6,191,901 B1 | 2/2001 | Carlson et al. | |
| 6,268,976 B1 | 7/2001 | Carlson et al. | |
| 6,288,856 B1 | 9/2001 | Ottesen et al. | |
| 6,310,740 B1 | 10/2001 | Dunbar et al. | |
| 6,417,981 B1 | 7/2002 | Smith | |
| 6,452,735 B1 | 9/2002 | Egan et al. | |
| 6,459,539 B1 | 10/2002 | Carlson et al. | |
| 6,493,169 B1 | 12/2002 | Ferris et al. | |
| 6,501,606 B2 | 12/2002 | Boutaghou et al. | |
| 6,519,102 B1 | 2/2003 | Smith et al. | |
| 6,608,727 B2 | 8/2003 | Ottesen et al. | |
| 6,611,389 B1 | 8/2003 | Liu et al. | |

(Continued)

OTHER PUBLICATIONS

Shiramatsu et al., "Dynamically Controlled Thermal Flying-Height Control Slider", IEEE Transactions on Magnetics, vol. 44, Issue 11, Nov. 2008, pp. 3695-3697.

*Primary Examiner* — Joseph Feild
*Assistant Examiner* — James L Habermehl

(57) ABSTRACT

A disk drive is disclosed comprising a disk having a plurality of tracks, and a head actuated over the disk. The disk drive further comprises control circuitry including a fly height actuator. A fly height map is measured for at least one track. A constant FHC signal applied to the fly height actuator is adjusted to decrease an average fly height of the head. After decreasing the average fly height of the head, a fluctuating fly height control (FHC) signal is applied to the fly height actuator to adjust a fly height of the head in response to the fly height map. When the head contacts the disk, an operating FHC signal is determined. The operating FHC signal is applied to the fly height actuator while executing at least one of a read and write operation.

18 Claims, 7 Drawing Sheets

U.S. PATENT DOCUMENTS

| | | |
|---|---|---|
| 6,624,957 B1 | 9/2003 | Yun |
| 6,671,110 B2 | 12/2003 | Baba et al. |
| 6,671,111 B2 | 12/2003 | Ottesen et al. |
| 6,674,590 B2 | 1/2004 | Ottesen et al. |
| 6,678,108 B2 | 1/2004 | Smith et al. |
| 6,700,724 B2 | 3/2004 | Riddering et al. |
| 6,717,764 B2 | 4/2004 | Lake |
| 6,735,027 B2 | 5/2004 | Helsel et al. |
| 6,762,899 B2 | 7/2004 | Ottesen et al. |
| 6,765,745 B2 | 7/2004 | Smith et al. |
| 6,785,081 B2 | 8/2004 | Chapin et al. |
| 6,798,605 B2 | 9/2004 | Kurita et al. |
| 6,801,376 B2 | 10/2004 | Smith |
| 6,822,816 B2 | 11/2004 | Dakroub |
| 6,865,040 B2 | 3/2005 | Fayeulle et al. |
| 6,883,368 B2 | 4/2005 | Smith et al. |
| 6,888,694 B2 | 5/2005 | Guo et al. |
| 6,894,854 B1 | 5/2005 | Carlson et al. |
| 6,930,844 B2 | 8/2005 | Yeh et al. |
| 6,950,266 B1 | 9/2005 | McCaslin et al. |
| 6,968,731 B2 | 11/2005 | Hu et al. |
| 6,980,383 B2 | 12/2005 | Brunnett et al. |
| 6,992,853 B2 | 1/2006 | Chang |
| 7,016,131 B2 | 3/2006 | Liu et al. |
| 7,023,647 B2 | 4/2006 | Bloodworth et al. |
| 7,038,875 B2 | 5/2006 | Lou et al. |
| 7,046,463 B2 | 5/2006 | Gay Sam et al. |
| 7,068,449 B2 | 6/2006 | Riddering et al. |
| 7,068,451 B1 | 6/2006 | Wang et al. |
| 7,068,457 B2 | 6/2006 | Riddering et al. |
| 7,092,195 B1 | 8/2006 | Liu et al. |
| 7,095,578 B2 | 8/2006 | Ma |
| 7,158,325 B1 | 1/2007 | Hu et al. |
| 7,180,692 B1 | 2/2007 | Che et al. |
| 7,215,500 B1 | 5/2007 | Albrecht et al. |
| 7,253,984 B1 | 8/2007 | Patapoutian et al. |
| 7,265,933 B1 | 9/2007 | Phan et al. |
| 7,271,975 B2 | 9/2007 | Shimizu et al. |
| 7,324,299 B1 | 1/2008 | Schreck et al. |
| 7,349,170 B1 * | 3/2008 | Rudman et al. ................. 360/75 |
| 7,359,138 B1 | 4/2008 | Albrecht et al. |
| 7,369,340 B1 | 5/2008 | Dang et al. |
| 7,375,914 B1 | 5/2008 | Dieron et al. |
| 7,376,182 B2 | 5/2008 | Kris |
| 7,426,090 B2 | 9/2008 | Yamashita et al. |
| 7,450,333 B2 | 11/2008 | Hirano et al. |
| 7,457,072 B2 | 11/2008 | Dieron et al. |
| 7,508,617 B1 | 3/2009 | Mak et al. |
| 7,583,466 B2 | 9/2009 | Kermiche et al. |
| 7,605,997 B2 | 10/2009 | Yamazaki |
| 7,675,707 B1 | 3/2010 | Liu et al. |
| 7,729,080 B2 * | 6/2010 | Suzuki ............................ 360/75 |
| 7,839,595 B1 | 11/2010 | Chue et al. |
| 7,916,420 B1 | 3/2011 | McFadyen et al. |
| 2002/0167745 A1 | 11/2002 | Ottesen et al. |
| 2003/0002183 A1 | 1/2003 | Fioravanti |
| 2003/0043491 A1 | 3/2003 | Riddering et al. |
| 2003/0133220 A1 | 7/2003 | Hsin |
| 2003/0184899 A1 | 10/2003 | Gay Sam et al. |
| 2003/0184907 A1 | 10/2003 | Li et al. |
| 2003/0218813 A1 | 11/2003 | Dakroub |
| 2004/0075940 A1 | 4/2004 | Bajorek et al. |
| 2005/0128630 A1 | 6/2005 | Huang et al. |
| 2006/0158769 A1 | 7/2006 | Ono et al. |
| 2006/0268445 A1 | 11/2006 | Brannon et al. |
| 2007/0127148 A1 | 6/2007 | Yokohata et al. |
| 2007/0211368 A1 | 9/2007 | Shibano et al. |
| 2007/0268615 A1 | 11/2007 | McFadyen et al. |
| 2008/0088962 A1 * | 4/2008 | Baral ............................ 360/60 |
| 2008/0130159 A1 | 6/2008 | Dieron et al. |
| 2008/0158730 A1 * | 7/2008 | Furukawa et al. ............ 360/110 |
| 2008/0165446 A1 | 7/2008 | Partee |
| 2008/0239547 A1 | 10/2008 | Okamura |
| 2009/0002860 A1 * | 1/2009 | Takamatsu et al. ............. 360/31 |
| 2009/0141390 A1 | 6/2009 | Oyamada et al. |
| 2009/0195912 A1 | 8/2009 | Sato |

* cited by examiner

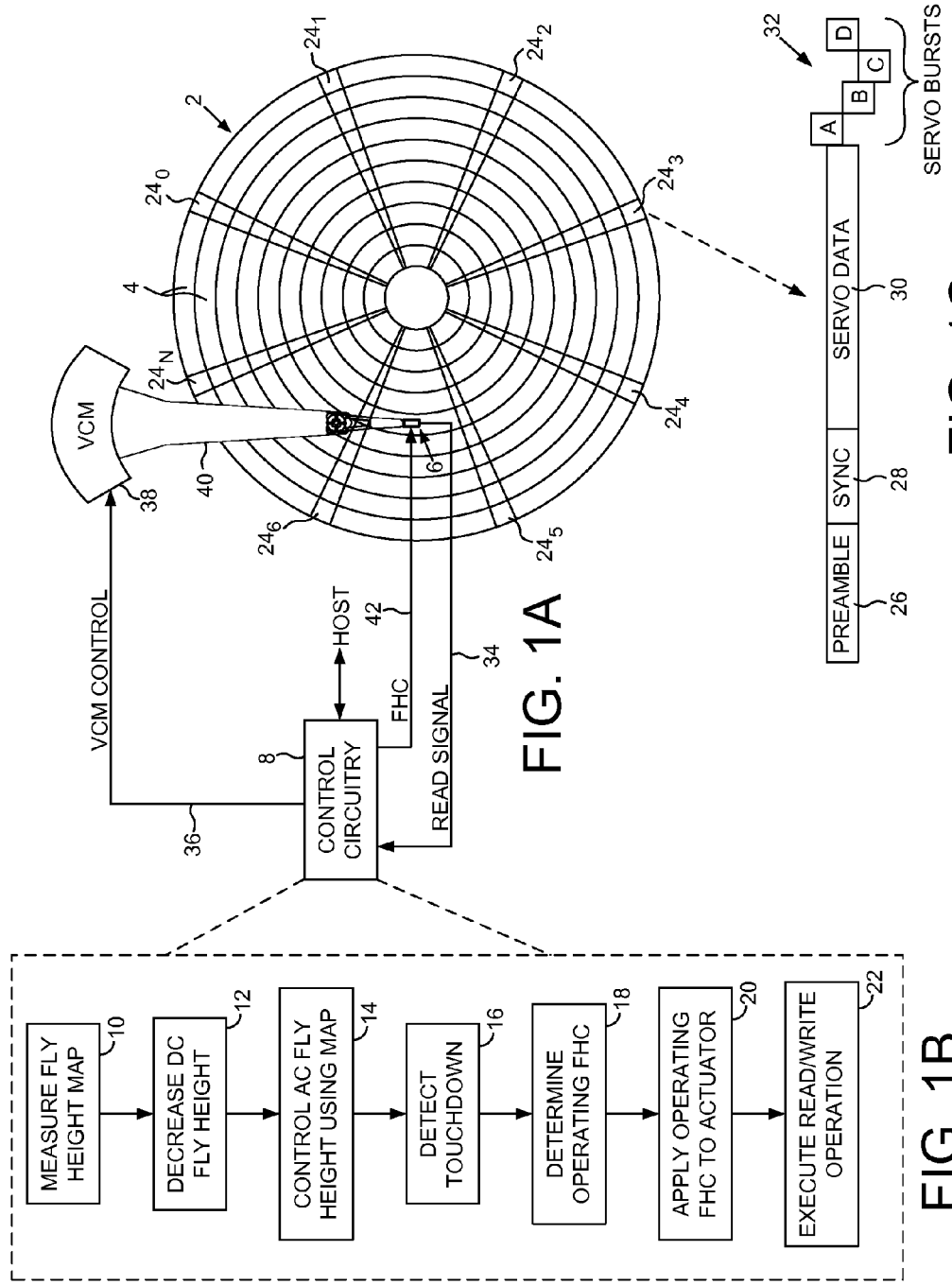

DISK DRIVE ADJUSTING FLY HEIGHT WHEN CALIBRATING HEAD/DISK CONTACT

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

BRIEF DESCRIPTION OF THE DRAWINGS

FIG. 1A shows a disk drive according to an embodiment of the present invention comprising a head actuated over a disk, and control circuitry including a fly height actuator.

FIG. 1B is a flow diagram according to an embodiment of the present invention wherein an operating fly height control (FHC) signal is determined when calibrating head touchdown.

FIG. 1C shows a format of a servo sector recorded on the disk according to an embodiment of the present invention.

DETAILED DESCRIPTION OF EMBODIMENTS OF THE INVENTION

Figure 2A:
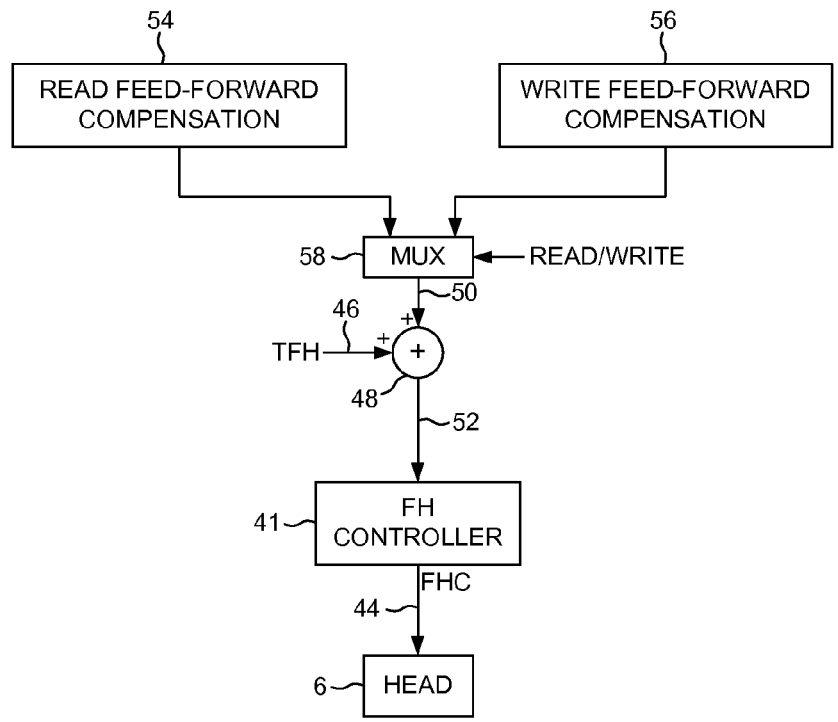
FIG. 2A shows control circuitry for applying a constant and a fluctuating FHC signal to the fly height actuator open loop according to an embodiment of the present invention.

FIG. 1A shows a disk drive according to an embodiment of the present invention comprising a disk 2 having a plurality of tracks 4, a head 6 actuated over the disk 2, and a fly height actuator (integrated with the head 6) for adjusting a fly height of the head 6. The disk drive further comprises control circuitry 8 operable to execute the flow diagram of FIG. 1B wherein a fly height map is measured for at least one track (step 10). A constant FHC signal applied to the fly height actuator is adjusted to decrease an average fly height of the head (step 12). After decreasing the average fly height of the head 6, a fluctuating fly height control (FHC) signal is applied to the fly height actuator to adjust a fly height of the head in response to the fly height map (step 14). When the head contacts the disk (step 16), an operating FHC signal is determined (step 18). The operating FHC signal is applied to the fly height actuator (step 20) while executing at least one of a read and write operation (step 22).

In the embodiment of FIG. 1A, the data tracks 4 are defined by a plurality of embedded servo sectors $24_0$-$24_N$. FIG. 1C shows an example servo sector $24_i$ comprising a preamble 26 for storing a periodic pattern which allows proper gain adjustment and timing synchronization of the read signal, and a sync mark 28 for storing a special pattern used to symbol synchronize to a servo data field 30. The servo data field 30 stores coarse head positioning information, such as a track address, used to position the head over a target data track during a seek operation. Each servo sector $24_i$ further comprises groups of servo bursts 32 (e.g., A, B, C and D bursts) which comprise a number of consecutive transitions recorded at precise intervals and offsets with respect to a data track centerline. The groups of servo bursts 32 provide fine head position information used for centerline tracking while accessing a data track during write/read operations. As the head 6 passes over a servo sector, the control circuitry 8 demodulates the read signal 34 into a position error signal (PES). The PES is filtered by a suitable compensation filter to generate a control signal 36 applied to a voice coil motor (VCM) 38. The VCM 38 rotates an actuator arm 40 about a pivot in order to position the head 6 radially over the disk 2 in a direction that reduces the PES.

In the embodiments of the present invention, a suitable fly height actuator is integrated with the head 6, such as a suitable heater or piezoelectric actuator. The control circuitry 8 generates a fly height control (FHC) signal 42 applied to the fly height actuator in order to maintain the head 6 at a target fly height while writing data to and reading data from the disk 2. The control circuitry 8 generates the FHC signal 42 by adding a fluctuating (AC) FHC signal to a constant (DC) FHC signal, wherein the constant FHC maintains an average fly height for the head 6 and the fluctuating FHC follows the real-time fly height deviations of the head due to disk warping, spindle motor vibrations, etc.

In one embodiment, an operating FHC signal used during normal operation of the disk drive is determined by decreasing the DC fly height of the head 6 (by adjusting the constant FHC signal) until the head 6 contacts the disk 2 (touchdown). The operating FHC signal may then be determined, for example, relative to the constant FHC signal applied to the fly height actuator that causes the touchdown. In one embodiment, the operating FHC signal is determined by backing off the constant FHC signal that causes the touchdown. In another embodiment, a suitable technique may be employed to measure the fly height of the head 6 relative to when the touchdown is detected, and then select the operating FHC signal that achieves a target fly height. For example, the constant FHC signal applied to the fly height actuator is correlated with the measured fly height based on when touchdown is detected so that an operating FHC signal can be selected that will achieve a target fly height.

When calibrating the operating FHC signal, it is desirable to accurately detect when touchdown occurs so as to minimize damage to the head 6 as it contacts the disk surface, as well as ensure the best operating FHC signal is selected. As the disk rotates, variations in the fly height may occur, for example, due to disk warping or the spindle motor vibrating which create "peaks" and "valleys". If these variations in fly height are not accounted for, the head may be damaged due to striking peaks until touchdown is finally detect. Alternatively, touchdown may be detected too early due to the head striking a peak, resulting in sub-optimal selection of the operating FHC signal. Accordingly, in one embodiment of the invention the variations in the fly height over a disk revolution are measured to generate a fly height map, and this fly height map is used to adjust the fly height of the head so as to follow the fly height map during the touchdown detection procedure.

FIG. 2A shows control circuitry according to an embodiment of the present invention including a fly height controller 41 for generating an analog fly height control (FHC) signal 44 applied to the fly height actuator integrated with the head 6. A target fly height (TFH) 46 represents a target "DC" fly height for the head 6. An adder 48 adds a feed-forward compensation value 50 to the TFH 46 to generate a digital fly height control signal 52 applied to the fly height controller 42, wherein the feed-forward compensation values 50 represent an "AC" fly height for the head 6 and are generated in response to the measured fly height map. In this manner, the fly height of the head 6 is controlled so as to follow the fly height deviations over a disk rotation when performing the touchdown calibration by incrementally reducing the DC fly height.

In the embodiment of FIG. 2A, read feed-forward compensation values 54 may be generated for read operations, and write feed-forward compensation values 56 may be generated for write operations. A multiplexer 58 selects the appropriate feed-forward compensation value depending on whether the control circuitry is executing a read or write operation. In one embodiment, feed-forward compensation values may also be generated for other modes, such as during idle or when seeking the head 6 to a target track. The difference between read and write feed-forward compensation values may be determined in any suitable manner. In one embodiment, the read feed-forward compensation values 54 are generated using a harmonic ratio (HR) fly height measurement described in greater detail below which may be more sensitive to the fly height of the read element in the head 6. The write feed-forward compensation values 56 may be generated using an overwrite (OW) fly height measurement described in greater detail below which may be more sensitive to the fly height of the write element in the head 6. The feed-forward compensation values may be generated at any suitable resolution, such as once per servo sector 24₀-24_N (FIG. 1A).

Figure 2B:
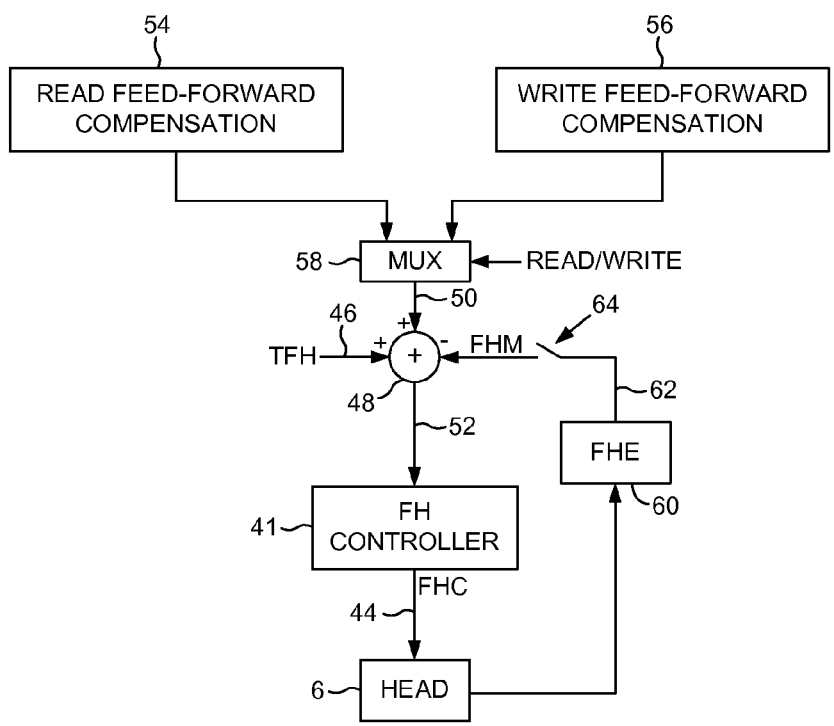
FIG. 2B shows control circuitry for applying a constant and a fluctuating FHC signal to the fly height actuator closed loop according to an embodiment of the present invention.

In the embodiment of FIG. 2A the feed-forward compensation values 50 are applied using "open loop" control. In an alternative embodiment shown in FIG. 2B, the feed-forward compensation values 50 may be applied using "closed loop" control where a fly height estimator (FHE) 60 generates a fly height measurement (FHM) 62 that is subtracted from the target fly height (TFH) 46 and the feed-forward compensation value 50 to generate the digital fly height control signal 52. The FHE 60 may measure the fly height using any suitable technique, such as a HR fly height measurement, an OW fly height measurement, by measuring the capacitance between the head and the disk surface, etc. If a loop compensation filter is employed, the difference between TFH and FHM (the fly height error) may be filtered before adding the feed-forward compensation value 50. A switch 64 may disable the feedback when measuring the fly height map used to generate the feed-forward compensation values 50.

In one embodiment, after generating the initial feed-forward compensation values in response to the measured fly height map, the switch 64 may be closed and the feed-forward compensation values may be adjusted closed loop in a manner that reduces the difference between the TFH and the FHM. The feed-forward compensation values may be adjusted in any suitable manner, such as by adjusting an amplitude (decrease or increase) of each feed-forward compensation value. In another embodiment, the initial feed-forward compensation values may be generated at a particular frequency or frequencies of interest (e.g., at a harmonic of the spindle motor). For example, the initial feed-forward compensation values may be processed in order to extract a sinusoid at frequencies of interest (e.g., the fundamental and harmonics of the spindle motor). Coefficients of the sinusoid(s) may then be adjusted in order to adjust both the amplitude and phase of the frequency component in a manner that reduces the difference between the TFH and the FHM.

Figure 3A:
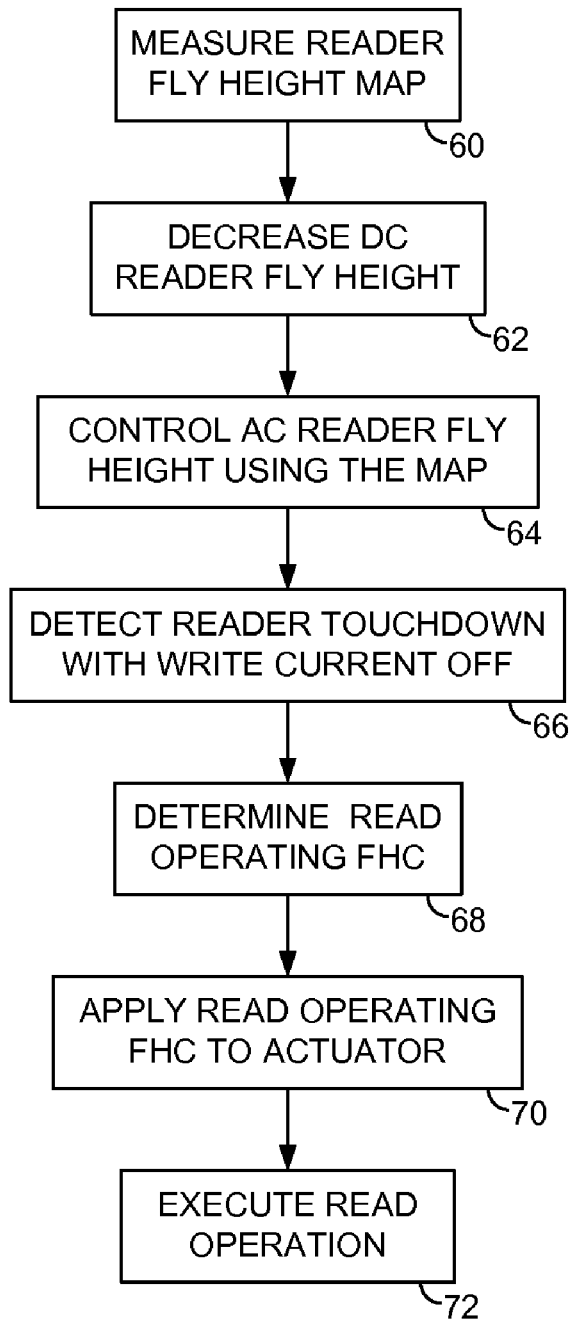
FIG. 3A is a flow diagram according to an embodiment of the present invention wherein a read operating FHC signal is determined when calibrating head touchdown.

FIG. 3A shows a flow diagram according to an embodiment of the present invention wherein the head 6 comprises a read element (e.g., a magnetoresistive element) and a write element. A fly height map is measured for the read element (step 60) using any suitable technique (e.g., the HR method described below). A constant FHC signal (e.g., the TFH of FIG. 2A) is adjusted in order to decrease the DC fly height of the read element (step 62). After decreasing the DC fly height of the read element, a fluctuating FHC signal is applied to the fly height actuator to control the AC reader fly height (step 64), wherein the fluctuating FHC signal (e.g., read feed-forward compensation values 54 of FIG. 2A) are generated in response to the reader fly height map. Touchdown of the read element is detected with the write current off (step 66), and a read operating FHC signal is determined when the touchdown is detected (step 68). The read operating FHC signal is applied to the fly height actuator (step 70) when executing a read operation (step 72).

Figure 3B:
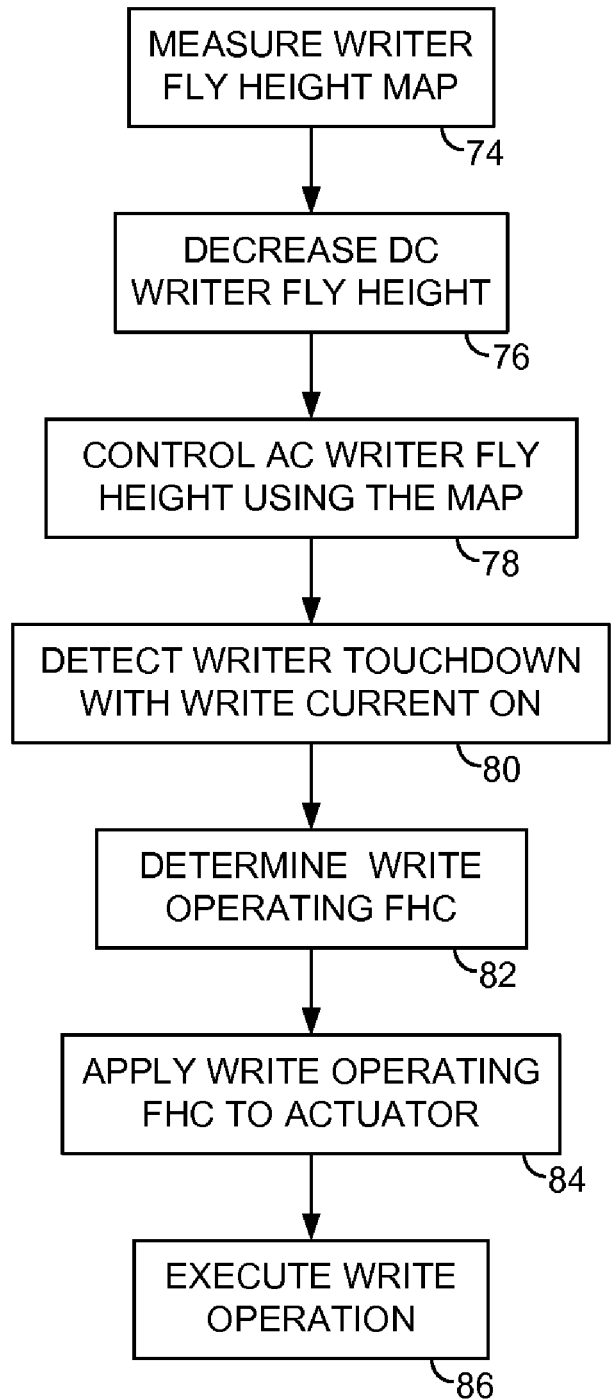
FIG. 3B is a flow diagram according to an embodiment of the present invention wherein a write operating FHC signal is determined when calibrating head touchdown.

FIG. 3B shows a flow diagram according to an embodiment of the present invention wherein a fly height map is measured for the write element (step 74) using any suitable technique (e.g., the OW method described below). A constant FHC signal (e.g., the TFH of FIG. 2A) is adjusted in order to decrease the DC fly height of the write element (step 76). After decreasing the DC fly height of the write element, a fluctuating FHC signal is applied to the fly height actuator to control the AC writer fly height (step 78), wherein the fluctuating FHC signal (e.g., write feed-forward compensation values 56 of FIG. 2A) are generated in response to the writer fly height map. Touchdown of the write element is detected with the write current on (step 80), and a write operating FHC signal is determined when the touchdown is detected (step 82). The write operating FHC signal is applied to the fly height actuator (step 84) when executing a write operation (step 86).

Figure 4:
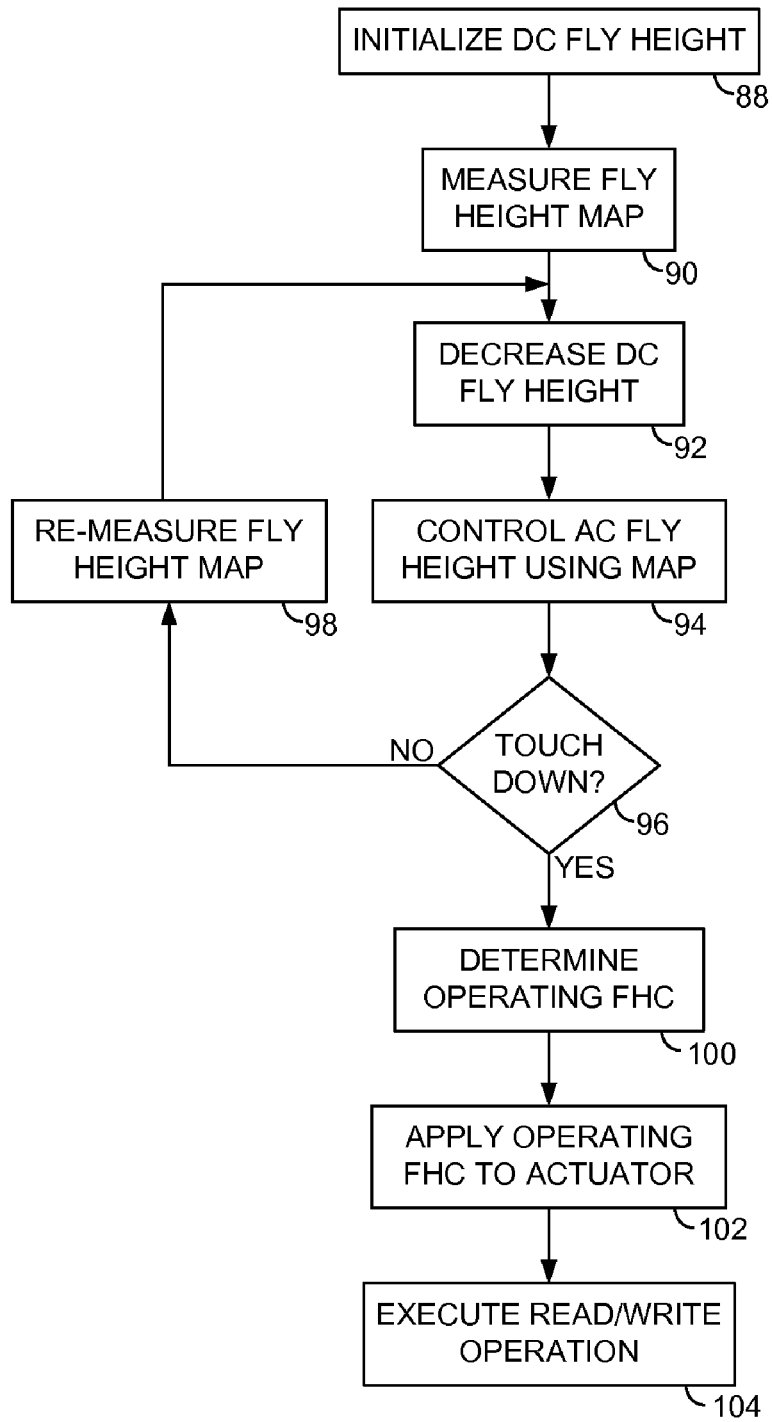
FIG. 4 is a flow diagram according to an embodiment of the present invention wherein the fly height map is re-measured after adjusting the constant FHC signal.

FIG. 4 is a flow diagram according to an embodiment of the present invention wherein a constant FHC signal is initialized (step 88) in order to configure an initial DC fly height for the head (e.g., a high fly height). A fly height map is then generated for the head (step 90). The DC fly height of the head is decreased by adjusting the constant FHC signal (step 92). After decreasing the DC fly height of the head, an AC fly height for the head is controlled in response to the fly height map by applying a fluctuating FHC signal to the fly height actuator (step 94). If touchdown of the head is not detected at the decreased DC fly height (step 96), the fly height map for the head is re-measured (step 98) and the process is repeated starting with step 92. When touchdown is detected (step 96), an operating FHC signal is determined for the head (step 100). The operating FHC signal is then applied to the fly height actuator (step 102) when executing a read/write operation (step 104). In one embodiment, the flow diagram of FIG. 4 is executed for both the read and write element in order to generate read and write operating FHC signals as described above.

Any suitable technique may be employed to detect when the head 6 contacts the disk 2 (i.e., touchdown). In one embodiment, a pattern may be read from the disk (e.g., a 2T test pattern or the preamble of a data/servo sector or the servo bursts) and the read signal evaluated to detect touchdown. Touchdown may be detected from the read signal using any suitable technique, such as by detecting a change in an amplitude of the read signal. In one embodiment, the amplitude of the read signal may be used to measure a change in fly height (e.g., using a Wallace spacing equation) wherein touchdown is detected when the measured fly height stops changing (or the change falls below a threshold). In other embodiments, touchdown may be detected by detecting a change in the disk rotation speed due to the head contacting the disk. The change in rotation speed may be detected in any suitable manner, such as by evaluating a servo control signal for controlling the speed of the spindle motor, or by detecting a change in the timing between servo sectors.

Figure 5A:
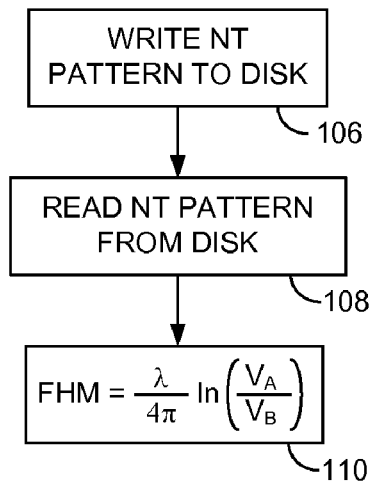
FIG. 5A is a flow diagram according to an embodiment of the present invention wherein the fly height is measured using a harmonic ratio (HR) method.

Any suitable technique may be employed to generate the fly height measurements for each disk surface. FIG. 5A shows an embodiment of the present invention wherein the fly height measurement is generated using a harmonic ratio (HR) method. An NT pattern (e.g., 2T pattern) is written to the disk (step 106), and then read from the disk (step 108). A fly height measurement (FHM) is generated (step 110) by measuring an amplitude of the read signal at a first harmonic ($V_A$) and at a second harmonic ($V_B$). A log of the ratio ($V_A/V_B$) is then multiplied by ($\lambda/4\pi$), where $\lambda$ is the frequency of the NT read signal in the spatial domain (i.e., velocity/write_frequency). In one embodiment, the first harmonic is the fundamental harmonic of the NT read signal, and the second harmonic is the third harmonic of the NT read signal. The NT pattern may be written in the user data area between the servo sectors (FIG. 1A) and the HR fly height measurement generated at any suitable resolution (e.g., once per data sector). In another embodiment, the preamble and/or the servo bursts within the servo sectors and/or the preamble of a data sector may be read to generate the NT read signal for performing the HR fly height measurement.

In one embodiment, the amplitude of the second harmonic may be generated by writing and reading a higher frequency NT pattern and extracting the fundamental frequency from the NT read signal. For example, the amplitude of the first harmonic may be generated by writing and reading a 6T pattern and extracting the fundamental frequency from the 6T read signal, and the second harmonic may be generated by writing and reading a 2T pattern and extracting the fundamental frequency from the 2T read signal.

Figure 5B:
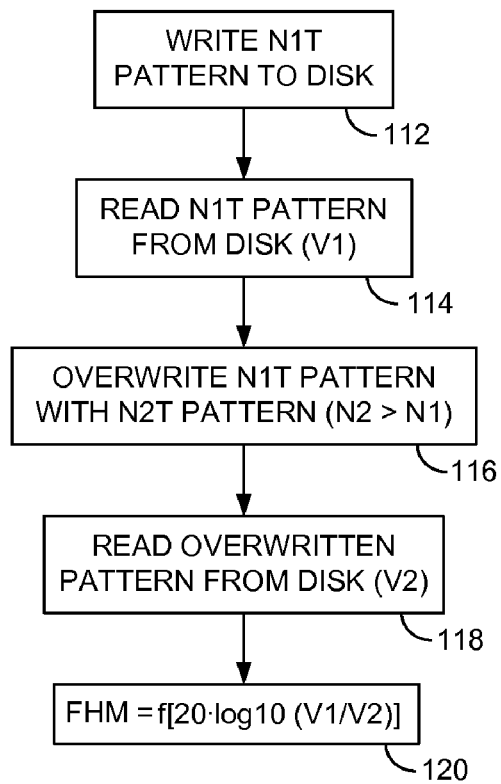
FIG. 5B is a flow diagram according to an embodiment of the present invention wherein the fly height is measured using an overwrite (OW) method.

FIG. 5B is a flow diagram according to an embodiment of the present invention for generating the fly height measurement using an overwrite (OW) method. A first N1T pattern (e.g., 2T pattern) is written to the disk (step 112) and an amplitude V1 of the read signal measured while reading the pattern (step 114). A second N2T pattern (e.g., 13T pattern) is written over the N1T pattern (step 116) wherein N2T is greater than N1T. An amplitude V2 of the read signal (at frequency 1/N1T) is measured when reading the overwritten pattern from the disk (step 118). The fly height measurement is then generated (step 120) as a function of twenty times the log 10(V1/V2). The equation of FIG. 5B generates units of decibels rather than units of length and therefore in one embodiment the decibel units may be transformed into units of length using any suitable function. In other embodiments, the decibel units may be used directly, for example, to qualify/screen the spindle motor and/or to generate feed-forward compensation values described below.

The OW fly height method of FIG. 5B may provide a suitable fly height measurement for disk drives employing perpendicular recording (wherein the magnetic write field is perpendicular to the disk surface). In another embodiment, a reverse OW fly height method may be employed for disk drives employing longitudinal magnetic recording (where the magnetic write current is in-plane with the disk surface). In the reverse OW fly height method, the frequency of the first N1T pattern is less than the frequency of the second N2T pattern (i.e., N2<N1).

The fly height measurement for the head may be generated using any suitable technique instead of, or in addition to, the HR fly height measurement and the OW fly height measurement described above. For example, a capacitance between the head and the disk surface may be measured and correlated with fly height. In one embodiment, multiple fly height measurements may be generated using different techniques, and the results averaged to get a more accurate measurement. In another embodiment, the fly height may be measured at multiple tracks (e.g., for a band of tracks) and the results averaged to improve the accuracy of the fly height measurement. In yet another embodiment, the fly height measurement may be generated at multiple radial locations across the disk surface (e.g., at multiple zones). The resulting measurements may be used to generate an operating FHC signal for each zone.

In one embodiment, an amplitude of the read signal may be evaluated to generate the fly height measurement. For example, the above described HR fly height measurement and OW fly height measurement involve measuring an amplitude of the read signal at specific frequencies (e.g., 2T or 6T frequencies). In another embodiment, the amplitude of the read signal may be input into a Wallace spacing equation to measure the fly height. The amplitude of the read signal may be measured directly by evaluating the read signal in the analog or discrete-time domain before the read signal has been amplified to match a target amplified read signal amplitude, or the amplitude may be measured indirectly by monitoring a read signal value that is indicative of the read signal amplitude. For example, in one embodiment the disk drive comprises a variable gain amplifier (VGA) for amplifying the read signal, and a VGA value, such as the VGA gain setting or the gain error used to generate the VGA gain setting may be evaluated to measure the amplitude of the read signal.

Figure 6A:
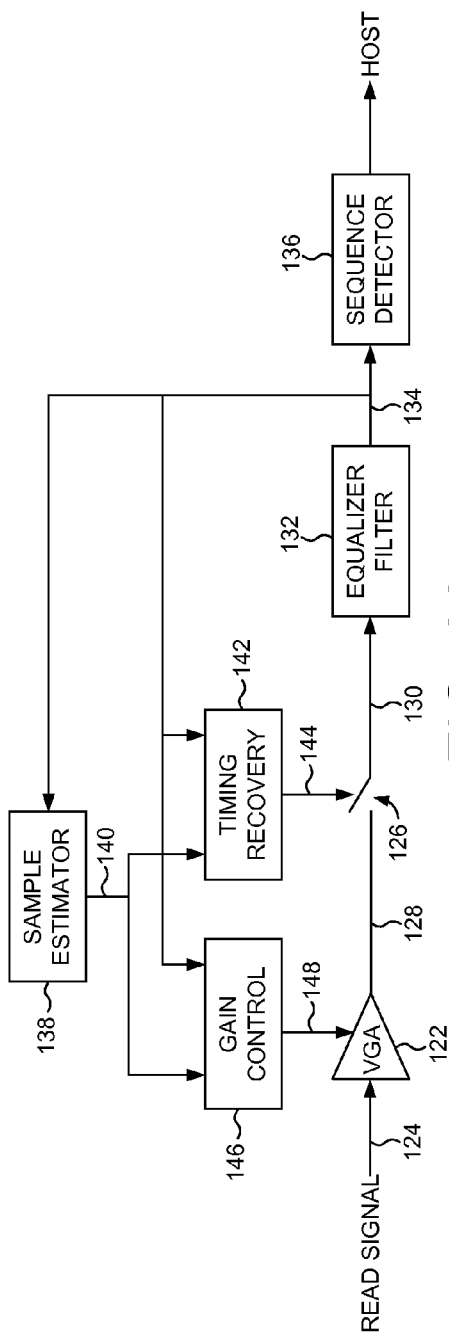
FIG. 6A shows read channel circuitry according to an embodiment of the present invention.

This embodiment is illustrated in FIG. 6A which shows read channel components according to an embodiment of the present invention, including a VGA 122 for amplifying a read signal 124 emanating from the head. The read channel further comprises a sampling device 126 for sampling the amplified read signal 128 to generate a sequence of read signal sample values 130. An equalizing filter 132 shapes the read signal sample values 130 according to a desired response (e.g., a partial response or PR) to generate equalized sample values 134. The equalized sample values 134 are processed by a sequence detector 136 (e.g., a Viterbi detector) to detect an estimated bit sequence representing the data recorded on the disk. The read channel further comprises a sample estimator 138 (e.g., a slicer) for estimating a target sample value 140 from an equalized sample value 134. The target sample value 140 and equalized sample value 134 are processed by timing recovery 142 to synchronize a sampling clock 144 to the baud rate of the data, and processed by gain control 146 to generate a VGA gain setting 148 for adjusting the gain of the VGA 122.

Figure 6B:
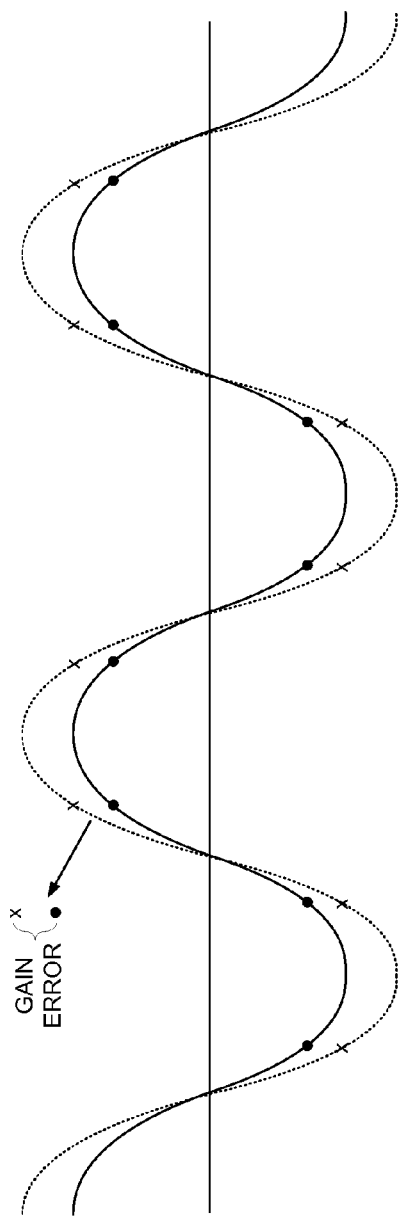
FIG. 6B shows an embodiment of the present invention wherein a fly height measurement is generated from a gain control loop.

Operation of the gain control 146 is understood with reference to FIG. 6B which shows a substantially sinusoidal read signal generated by reading a 2T pattern. The solid circles represent the measured amplified read signal samples, and the "x"s represent target sample values corresponding to a target amplitude of the amplified read signal. The resulting gain error is used to adjust the gain setting 148 and therefore the gain of the VGA 122. In the example of FIG. 6B, the gain error will increase the gain setting 148 so as to increase the amplitude of the amplified read signal 128 toward the target amplitude. Therefore, the gain error and/or the gain setting 148 may be evaluated to measure the amplitude of the read signal 124 input into the VGA 122, and the resulting amplitude measurement may be transformed into a fly height measurement using any suitable function.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk;
   a fly height actuator operable to adjust a fly height of the head; and
   control circuitry operable to:
     measure a fly height map for at least one track;
     adjust a constant fly height control (FHC) signal applied to the fly height actuator to decrease an average fly height of the head;
     after decreasing the average fly height of the head, apply a fluctuating FHC signal to the fly height actuator to adjust a fly height of the head in response to the fly height map;
     detect when the head contacts the disk;
     determine an operating FHC signal when the head contacts the disk; and
     apply the operating FHC signal to the fly height actuator during at least one of a read and write operation.

2. The disk drive as recited in claim 1, wherein the control circuitry is operable to apply the fluctuating FHC signal to the fly height actuator open loop.

3. The disk drive as recited in claim 1, wherein the control circuitry is operable to determine the operating FHC signal in response to the constant FHC signal applied to the fly height actuator when the head contacts the disk.

4. The disk drive as recited in claim 1, wherein:
   the control circuitry further comprises a fly height estimator for generating a measured fly height of the head; and
   the control circuitry is operable to determine the operating FHC signal in response to the measured fly height when the head contacts the disk.

5. The disk drive as recited in claim 1, wherein:
   the head comprises a read element and a write element; and
   the control circuitry is further operable to disable a current applied to the write element when detecting when the head contacts the disk.

6. The disk drive as recited in claim 1, wherein:
   the control circuitry is further operable to determine a read operating FHC signal for the head used during read operations and to determine a write operating FHC signal for the head used during write operations; and
   the read operating FHC signal is different from the write operating FHC signal.

7. The disk drive as recited in claim 1, wherein:
   the head comprises a read element and a write element;
   the control circuitry is further operable to measure an amplitude of an overwrite signal when measuring the fly height map; and
   the amplitude of the overwrite signal represents a fly height of the write element when measuring the fly height map.

8. The disk drive as recited in claim 7, wherein the control circuitry is further operable to:
   apply a write current to the write element; and
   determine a write operating FHC signal for the head when the head contacts the disk while applying the write current to the write element.

9. The disk drive as recited in claim 1, wherein the control circuitry is further operable to re-measure the fly height map after adjusting the constant FHC signal applied to the fly height actuator.

10. A method of operating a disk drive, the disk drive comprising a disk comprising a plurality of tracks, a head actuated over the disk, and a fly height actuator operable to adjust a fly height of the head, the method comprising:
    measuring a fly height map for at least one track;
    adjusting a constant fly height control (FHC) signal applied to the fly height actuator to decrease an average fly height of the head;
    after decreasing the average fly height of the head, applying a fluctuating FHC signal to the fly height actuator to adjust a fly height of the head in response to the fly height map;
    detecting when the head contacts the disk;
    determining an operating FHC signal when the head contacts the disk; and
    applying the operating FHC signal to the fly height actuator during at least one of a read and write operation.

11. The method as recited in claim 10, further comprising applying the fluctuating FHC signal to the fly height actuator open loop.

12. The method as recited in claim 10, further comprising determining the operating FHC signal in response to the constant FHC signal applied to the fly height actuator when the head contacts the disk.

13. The method as recited in claim 10, wherein the disk drive further comprises a fly height estimator for generating a measured fly height of the head, the method further comprises determining the operating FHC signal in response to the measured fly height when the head contacts the disk.

14. The method as recited in claim 10, wherein the head comprises a read element and a write element, the method further comprises disabling a current applied to the write element when detecting when the head contacts the disk.

15. The method as recited in claim 10, further comprising determining a read operating FHC signal for the head used during read operations and to determining a write operating FHC signal for the head used during write operations, wherein the read operating FHC signal is different from the write operating FHC signal.

16. The method as recited in claim 10, wherein the head comprises a read element and a write element, further comprising measuring an amplitude of an overwrite signal when measuring the fly height map, wherein the amplitude of the overwrite signal represents a fly height of the write element when measuring the fly height map.

17. The method as recited in claim 16, further comprising:

applying a write current to the write element; and determining a write operating FHC signal for the head when the head contacts the disk while applying the write current to the write element.

18. The method as recited in claim 10, further comprising re-measuring the fly height map after adjusting the constant FHC signal applied to the fly height actuator.

* * * * *